(12) United States Patent
Riskó et al.

(10) Patent No.: US 8,930,840 B1
(45) Date of Patent: Jan. 6, 2015

(54) DETERMINING DISPLAY ORDER FOR NAVIGATING BETWEEN APPLICATION WINDOWS AND NAVIGATING BETWEEN TABS IN A WINDOW

(75) Inventors: Gergely Riskó, Thalwil (CH); Mihaly Barasz, Adliswil (CH)

(73) Assignee: Google Inc., Mountain View, CA (US)

( * ) Notice: Subject to any disclaimer, the term of this patent is extended or adjusted under 35 U.S.C. 154(b) by 115 days.

(21) Appl. No.: 13/545,881

(22) Filed: Jul. 10, 2012

(51) Int. Cl.
*G06F 3/0481* (2013.01)

(52) U.S. Cl.
USPC .......................................... 715/777; 715/811

(58) Field of Classification Search
CPC .............................. G06F 3/0483; G06F 3/0481
USPC ......................................................... 715/777
See application file for complete search history.

(56) References Cited

U.S. PATENT DOCUMENTS

| | | | | |
|---|---|---|---|---|
| 6,122,663 | A * | 9/2000 | Lin et al. ........................ | 709/224 |
| 2001/0025314 | A1 * | 9/2001 | Matsumoto et al. ........... | 709/227 |
| 2006/0190938 | A1 * | 8/2006 | Capek et al. ................... | 717/161 |
| 2008/0005686 | A1 * | 1/2008 | Singh ............................. | 715/764 |
| 2008/0109753 | A1 | 5/2008 | Karstens | |
| 2009/0187443 | A1 * | 7/2009 | Hart ................................. | 705/7 |

OTHER PUBLICATIONS

Raskin, Aza, "Solving the Alt-Tab Problem", May 5, 2010, http://www.azarask.in/blog/post/solving-the-alt-tab-problem/.*
Raskin, Aza, "Solving the Alt-Tab Problem", 2010, retrieved from <http://www.azarask.in/blog/post/solving-the-alt-tab-problem>.
Oliver, et al., "RelAltTab: Assisting Users in Switching Windows", Proceedings of the 13th International Conference on Intelligent User Interfaces, 2008, pp. 385-388, retrieved from <http://www.nuriaoliver.com/RelAltTab/iui2008_oliver.pdf>.
Chierichetti, et al., "Stochastic Models for Tabbed Browsing", Proceedings of the 19th International Conference on World Wide Web, 2010, pp. 241-250, retrieved from <http://tomkinshome.com/site_media/papers/papers/CKT10.pdf>.
Gross, et al., "Improving Window Switching Interfaces", Interact, LNCS 5727, 2009, pp. 187-200, Part II.

* cited by examiner

*Primary Examiner* — William Bashore
*Assistant Examiner* — Daniel Rodriguez
(74) *Attorney, Agent, or Firm* — McDermott Will & Emery LLP

(57) ABSTRACT

A system and method for determining a display order for changing application windows or changing tabs within a window is provided. Windows or tabs that are open in a user interface of a computing device are identified. At least one duration of active time for each window or tab is tracked and a score for each window or tab is determined based on each duration of active time for the respective window or tab. The order of the windows or tabs is determined based on the scores. A graphical component for display in the user interface is provided that displays a representation of each of the plurality of windows or tabs in the determined order and is configured to receive a user selection of one of the plurality of windows or tabs to activate the selected window or tab.

21 Claims, 5 Drawing Sheets

DETERMINING DISPLAY ORDER FOR NAVIGATING BETWEEN APPLICATION WINDOWS AND NAVIGATING BETWEEN TABS IN A WINDOW

BACKGROUND

1. Field

The present disclosure generally relates to navigation between application windows and navigation between tabs, and more particularly to providing for determining a display order for changing between application windows and changing between tabs.

2. Description of the Related Art

Operating systems allow users to navigate between application windows. Web browsers allow users to navigate between tabs in a single open window. Current operating systems and web browsers allow users to navigate between application windows and between tabs by using shortcut keys.

SUMMARY

The disclosed subject matter relates to determining a display order for changing application windows. The method includes identifying a plurality of windows that are open in a user interface of a computing device, tracking at least one duration of active time for each of the plurality of windows, and determining a score for each of the plurality of windows based on each duration of active time for the respective window. The method also includes determining an order of the plurality of windows based on the score for each of the plurality of windows. The method additionally provides a graphical component for display in the user interface, wherein the graphical component displays a representation of each of the plurality of windows in the determined order and is configured to receive a user selection of one of the plurality of windows to activate the selected window.

The disclosed subject matter further relates to a system for providing for determining a display order for changing tabs within a window. The system includes one or more processor(s) and a memory containing processor-executable instructions. When executed by the processor(s), the system identifies a plurality of tabs that are open in the window of a user interface of a computing device, tracks at least one duration of active time for each of the plurality of tabs, and determines a score for each of the plurality of tabs based on each duration of active time for the respective tab. The system also determines an order of the plurality of tabs based on the score for each of the plurality of tabs and provides a graphical component for display in the user interface, wherein the graphical component displays a representation of each of the plurality of tabs in the determined order and is configured to receive a user selection of one of the plurality of tabs to activate the selected tab.

The disclosed subject matter also relates to a machine-executable storage medium comprising machine-readable instructions for determining a display order for changing application windows. The method includes identifying a plurality of windows that are open in a user interface of a computing device, tracking at least one duration of active time for each of the plurality of windows, and identifying a measuring point for each duration of active time for each of the plurality of windows. The method further includes determining a score for each of the plurality of windows based on each duration of active time and each measuring point for the respective window, determining an order of the plurality of windows based on the score for each of the plurality of windows, and providing a graphical component for display in the user interface, wherein the graphical component displays a representation of each of the plurality of windows in the determined order and is configured to receive a user selection of one of the plurality of windows to activate the selected window.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Certain features of the subject technology are set forth in the appended claims. However, for the purpose of explanation, several aspects of the subject technology are set forth in the following figures.

DETAILED DESCRIPTION

Figure 1:
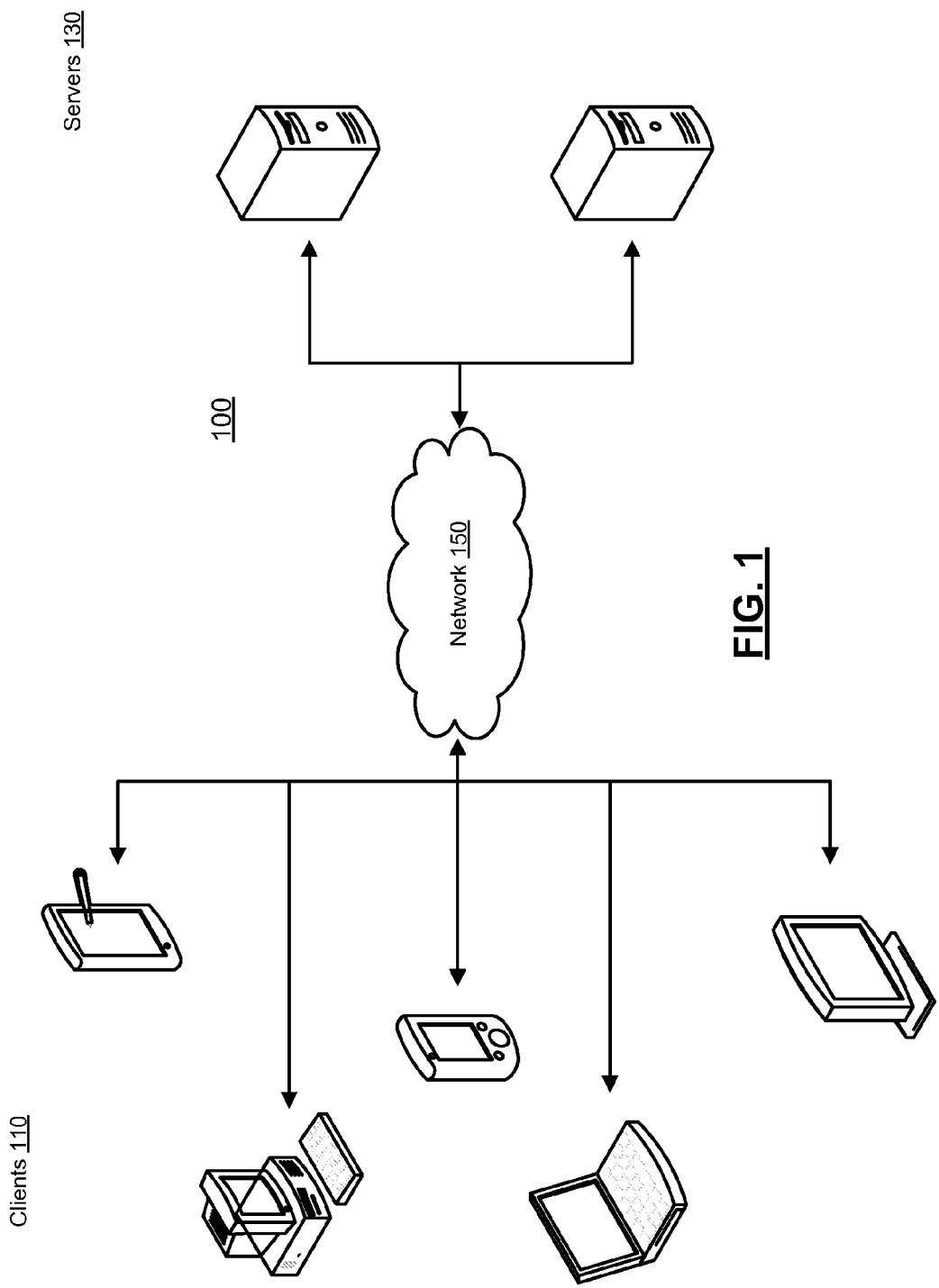
FIG. 1 illustrates a network that can include an example client for a display order for changing application windows or changing tabs within a window.

In the following detailed description, numerous specific details are set forth to provide a full understanding of the subject technology. It will be apparent, however, that different aspects of the subject technology may be practiced without some of these specific details. In other instances, well-known structures and techniques have not been shown in detail so as not to obscure the disclosure.

The disclosed subject matter describes systems and techniques for determining a display order for changing application windows and for determining a display order for changing between tabs within a window. Current computer operating systems allow users to change between open application windows using a graphical interface that displays a representation of currently open windows. Similarly, web browsers allow users to switch between multiple web pages that are displayed in tabbed windows in a single open window by using a graphical interface displaying a representation of each tab. Graphical interfaces that allow the user to switch between windows and switch between tabs require the user to incrementally advance through the open windows or tabs with shortcut keys in order to select a new window or tab to become the active window or tab. The order of display of the open windows or tabs is presented to the user in order of most recent use. In contrast, the subject technology improves the experience of the user by ordering the representation of each application or tab based on the duration of use.

In the case of changing between windows, the time at which each window is opened is determined. A window is considered active when that window is the single, currently selected window amongst all open windows. A window can also be considered active when any window dependent on that window is active (e.g., child window, pop-up window, or any nested window in a multiple document interface). The length of time for which each window is active is also determined. A window is no longer active when the window is minimized or another window becomes the active window. A screen saver can be treated as an active window that is opened upon its appearance and closed upon its disappearance for the purpose of tracking the lengths of time that windows are active. A score for each open window is determined based on the aggregate lengths of time that the window has been active.

When applying the disclosed method to mobile phone applications, if an application window "times-out," the application's maximum active time is limited each time the application is opened. An application window is considered inactive when a mobile device is locked. The score applies to applications and/or individual application windows on a mobile device and can be continuous, regardless of whether the mobile device has been turned off and regardless of whether the application is closed. That is, a score for an application on a mobile device is not reset when the application is closed and then re-opened. A higher score moves the application up in the order of open applications. The longer the length of time an application has been active, the higher the score. In order to consider recency of use in addition to the total length of time of activity, the beginning or ending time of the active use may be determined and may cause the score to decay as the recency of the beginning or ending time decays.

Implementations of the disclosed method for tabs in a single window include determining the time at which each tab is opened. The length of time for which each tab is active is also determined. The active tab in a single window is considered active, regardless of whether the window containing the tabs is minimized and regardless of whether the window itself is active with respect to other open windows. A tab is no longer active when another tab in the same window becomes the active tab. A score for each tab in the window is determined based on the aggregate lengths of time that the tab has been active. A higher score moves the application up in the order of tabs. The longer the length of time a tab has been active, the higher the score. Recency of use may be determined based on the beginning or ending time of the active use and may cause the score to decay as the recency of the beginning or ending time decays.

Turning to the drawings, FIG. 1 illustrates a network 100 that can include an example client 110 for determining a display order for changing application windows or changing tabs within a window. The system 100 includes clients 110 and servers 130 connected over a network 150.

The system 100 is comprised of client(s) 110, server(s) 130 and the network 150 in any combination or configuration including implementations with multiple servers 130. Each of the clients 110 can be, for example, a desktop computer, a laptop computer, a mobile device (e.g., a smartphone, tablet computer, or PDA), a set top box (e.g., for a television), a television with one or more processors embedded therein or coupled thereto, a video game console, or any other device having a processor, memory, and communications capabilities. The servers 130 can be any device having a processor, memory, and communications capability for hosting the data for installing and hosting the system. The network 150 can include, for example, any one or more of a personal area network (PAN), a local area network (LAN), a campus area network (CAN), a metropolitan area network (MAN), a wide area network (WAN), a broadband network (BBN), the Internet, and the like. Further, the network 150 can include, but is not limited to, any one or more of the following network topologies, including a bus network, a ring network, a mesh network, a star-bus network, tree or hierarchical network, and the like.

Figure 2:
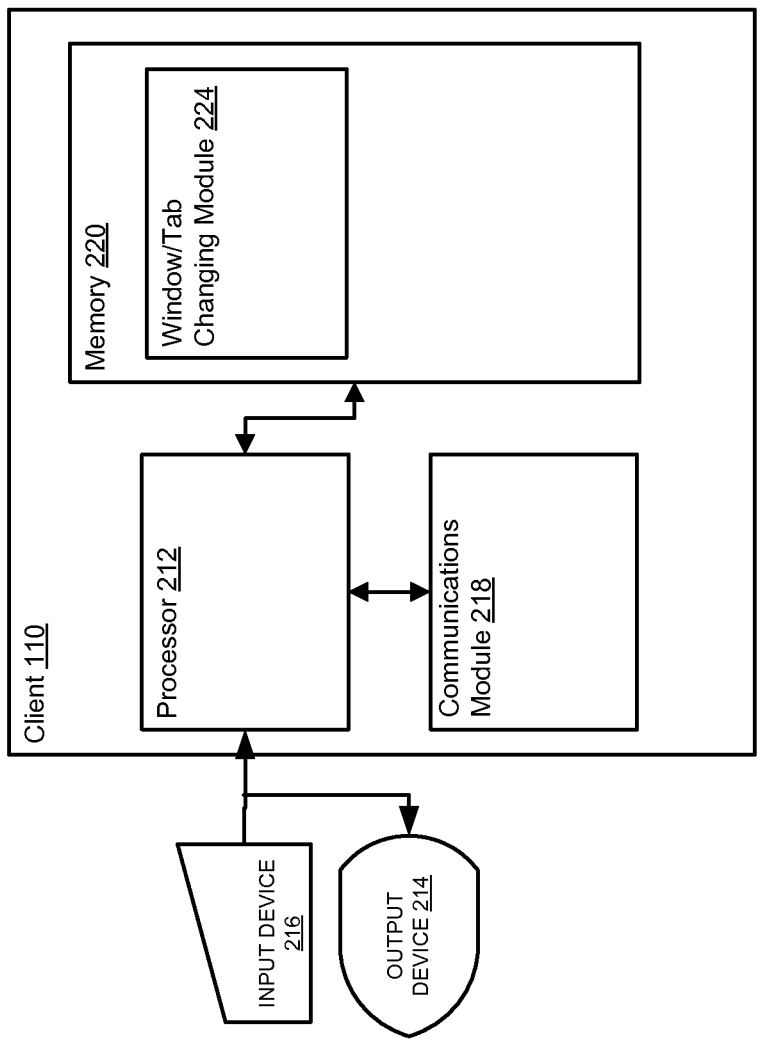
FIG. 2 is a block diagram illustrating an example client from the system of FIG. 1.

FIG. 2 is a block diagram illustrating an example client from the system 100 of FIG. 1 according to certain aspects of the subject technology. The client 110 is connected to server 130 over the network 150 via communications module 218. The communications module 218 is configured to interface with the network 150 to send and receive information, such as data, requests, responses, and commands to other devices on the network. The communications module 218 can be, for example, a modem or Ethernet card.

The client 110 includes a processor 212, the communications module 218, and a memory 220 that includes a window/tab changing module 224. The processor 212 of the client 110 is configured to execute instructions, such as instructions physically coded into the processor 212, instructions received from software in memory 220, or a combination of both. For example, an input device 216 may provide input to processor 212 which is processed by the window/tab changing module 224 stored in memory 220. Memory 220 can additionally contain information such as the duration of active times, measuring points for each duration of time, and an order of display as it applies to applications windows and tabs within a single window.

Figure 3:
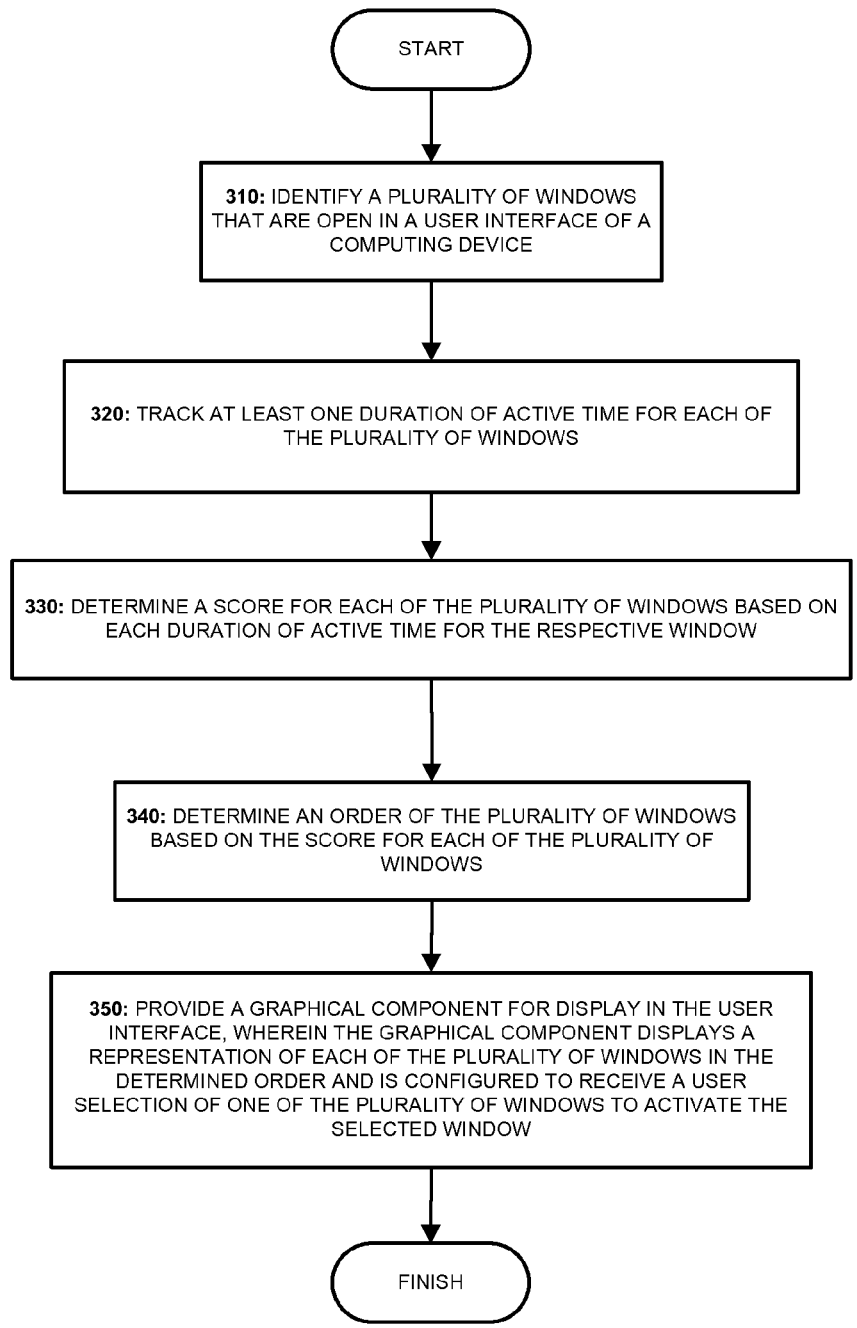
FIG. 3 illustrates an example process for determining a display order for changing application windows.

FIG. 3 illustrates an example process 300 for determining a display order for changing application windows as shown by the example client 110 of FIG. 2. Although process 300 of FIG. 3 is described with reference to FIG. 2, the process 300 is not limited to such a configuration and can be applied to other systems and configurations. Portions of the illustrated example process 300 may correspond or may apply to similar steps in the process for determining a display order for changing tabs within a window.

The process begins with step 310, in which a plurality of windows that are open in a user interface of a computing device are identified. A window, for example, is identified as open based on the opening of the associated application. A window may further be opened when a second instance of an already open application is opened.

The subject technology can also be used in a single window in which multiple tabs are opened. In this example, each tab that is open in a single window of a user interface is identified. A window is considered to be the first tab until other tabs are opened within the window.

In step 320, at least one duration of active time for each of the plurality of windows is tracked. The duration of active time can be determined as the length of time that a window remains active. A single window may have multiple durations of active time associated with it as the application becomes active, becomes idle, and becomes the active application again. A screen saver may be treated as an active window while it is in use. Accordingly, an application that is the active window at the time the screen saver is activated becomes an inactive window while the computer displays the screen saver. While the computer is sleeping and/or becomes idle, any active window may be considered an inactive window so that the duration of active time does not increase while the computer is in sleep mode or is idle. Once an application window is closed, the durations of active time for that window can be reset.

The duration of active time for each tab is tracked. A single tab can have multiple durations of active time associated with it as the tab becomes active, becomes idle, and becomes the active tab again. A tab that is separated from the original single window to become a separate window may have a separate duration of active time that is tracked. A tab that has been separated from the window in which it was opened, has its score reset. A tab that is added into a single window from a separate window may also have its active durations of time reset upon being joined with another window. Closing the window in which the tabs appear can result in resetting the durations of active times.

Implementations of the subject technology in mobile devices may reset the score only when the phone is powered down, reset, updated, or when the application associated with the window is shut down. Windows may not be considered closed on a mobile device unless the application associated with it is shut down.

In step 330, a score is determined for each of the plurality of windows based on each duration of active time for the respective window. The score may be based on both durations of active time and/or a measuring point for each duration of active time for each active window. The measuring point for each duration of active time can be set as the point in time at which the window becomes active, the point in time at which the window ceases to be active, or any point in between. The measuring point should be chosen similarly for each duration of active time so that the measuring point indicates the recency of the duration of time during which the window was active. The score is determined so that length and recency are favorable characteristics for an active window. That is, the score is determined such that windows that have been active more recently, and have been the active window for longer periods of time, are favored. Windows that have been recently active multiple times for short durations may be considered favorable. Windows that have been active for a single long duration of time may be considered favorable. The measuring point in a tab implementation has measuring points that are similarly chosen.

The score can be determined such that, as a portion of a score for a duration of time becomes less recent as time passes, the respective portion of the score also decays. The recency of the duration of time is associated with the score based on the measuring point. For a currently active window or tab, a portion of the score may increase as the duration of active time increases.

A window that contains one or more dependent windows, such as a multiple document interface, can be considered the active window when any one of the multiple documents is the currently active window. The active time of the window is then considered to be the total active time for each of the multiple documents.

A window or tab that has an automatic time limit (e.g., a secure web page, a game with a timer, and the like) may have the time associated with the tab or window affect the duration of active time. For instance, a game on a countdown timer that is open in a tab or window that is currently active becomes inactive upon the expiration of the timer. Thus, no window or tab is the active window or tab until the user selects another window or tab, or interacts with the game application.

In step 340, an order of the plurality of windows or tabs is determined based on the score for each of the plurality of windows or tabs. The order of the plurality of windows or tabs then reflects an order that favors windows or tabs that have been active the longest and windows or tabs that have been active most recently.

The process ends in step 350, in which a graphical component is provided for display in the user interface, wherein the graphical component displays a representation of each of the plurality of windows or tabs in the determined order and is configured to receive a user selection of one of the plurality of windows or tabs to activate the selected window or tab. The representation of each of the windows or tabs is an icon of the associated application, a screen shot of the active window or tab, descriptive text, and the like. The user then incrementally advances through the representations, gaining faster access to those application windows or tabs that have been used for longer and more recently, first.

Figure 4:
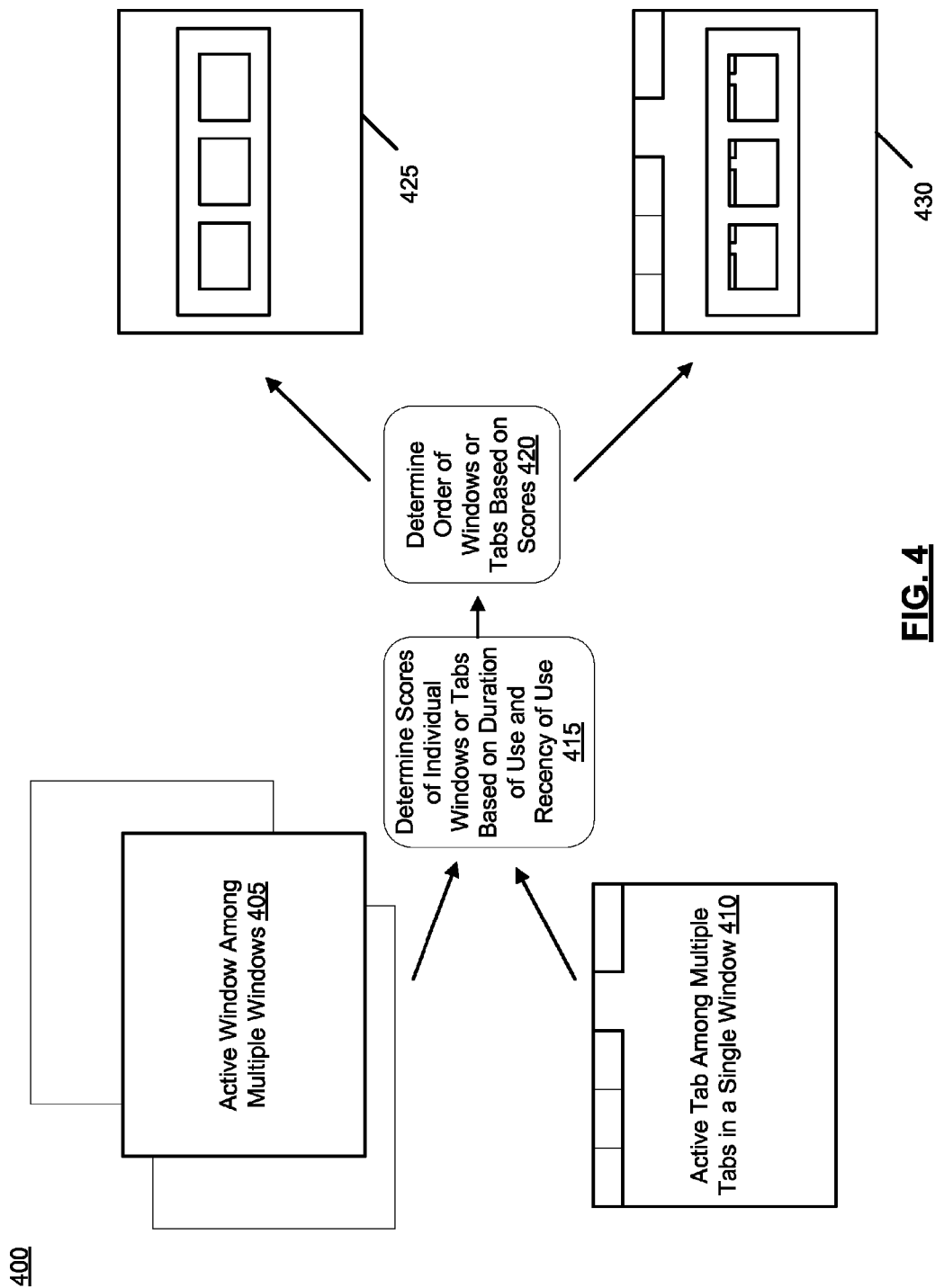
FIG. 4 is an illustration of the flow of determining a display order for changing application windows or changing tabs.

FIG. 4 is an illustration of the flow of determining a display order for changing application windows or changing tabs.

An active window among multiple windows 405 and an active tab among multiple tabs in a single window 410 are identified. The scores of each individual window or tab based on duration of use and recency of use 415 is determined. The order of windows or tabs is determined based on the scores 420. A representation of some or all of the open tables or windows are displayed in a user interface that allows the user to incrementally advance between the representations. The representations of the windows and the tabs 425 and 430 are displayed in the order that has been determined based on the score for each window and tab.

Many of the above-described features and applications are implemented as software processes that are specified as a set of instructions recorded on a computer-readable storage medium (also referred to as computer-readable medium). When these instructions are executed by one or more processing unit(s) (e.g., one or more processors, cores of processors, or other processing units), they cause the processing unit(s) to perform the actions indicated in the instructions. Examples of computer-readable media include, but are not limited to, CD-ROMs, flash drives, RAM chips, hard drives, EPROMs, etc. The computer-readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject technology can be implemented as sub-parts of a larger program while remaining distinct software aspects of the subject technology. In some implementations, multiple software aspects can also be implemented as separate programs. Finally, any combination of separate programs that together implement a software aspect described here is within the scope of the subject technology. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figure 5:
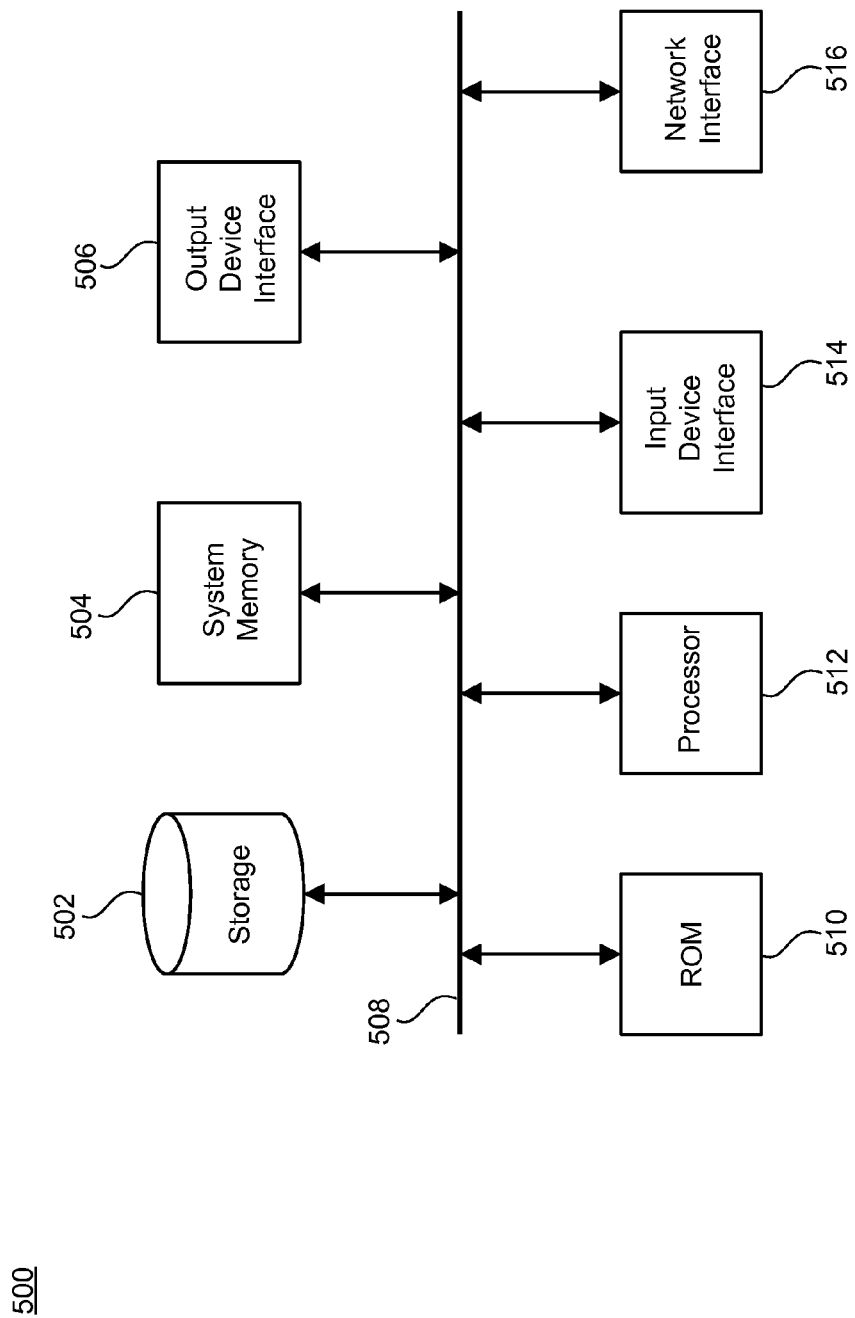
FIG. 5 is a block diagram illustrating an electronic system with which some implementations of the subject technology are implemented.

FIG. 5 conceptually illustrates an electronic system with which some implementations of the subject technology are implemented. Electronic system 500 can be a computer, phone, PDA, or any other sort of electronic device. Such an electronic system includes various types of computer-readable media and interfaces for various other types of computer-readable media. Electronic system 500 includes a bus 508, processing unit(s) 512, a system memory 504, a read-only memory (ROM) 510, a permanent storage device 502, an input device interface 514, an output device interface 506, and a network interface 516.

Bus 508 collectively represents all system, peripheral, and chipset buses that communicatively connect the numerous internal devices of electronic system 500. For instance, bus 508 communicatively connects processing unit(s) 512 with ROM 510, system memory 504, and permanent storage device 502.

From these various memory units, processing unit(s) 512 retrieves instructions to execute and data to process in order to execute the processes of the subject technology. The processing unit(s) can be a single processor or a multi-core processor in different implementations.

ROM 510 stores static data and instructions that are needed by processing unit(s) 512 and other modules of the electronic system. Permanent storage device 502, on the other hand, is a read-and-write memory device. This device is a non-volatile memory unit that stores instructions and data even when electronic system 500 is off. Some implementations of the subject technology use a mass-storage device (such as a magnetic or optical disk and its corresponding disk drive) as permanent storage device 502.

Other implementations use a removable storage device (such as a floppy disk, flash drive, and its corresponding disk drive) as permanent storage device 502. Like permanent storage device 502, system memory 504 is a read-and-write memory device. However, unlike storage device 502, system memory 504 is a volatile read-and-write memory, such as a random access memory. System memory 504 stores some of the instructions and data that the processor needs at runtime. In some implementations, the processes of the subject technology are stored in system memory 504, permanent storage device 502, and/or ROM 510. For example, the various memory units include instructions for providing for determining a display order for changing application windows or for changing tabs within a window in accordance with some implementations. From these various memory units, processing unit(s) 512 retrieves instructions to execute and data to process in order to execute the processes of some implementations.

Bus 508 also connects to input and output device interfaces 514 and 506. Input device interface 514 enables the user to communicate information and select commands to the electronic system. Input devices used with input device interface 514 include, for example, alphanumeric keyboards and pointing devices (also called "cursor control devices"). Output device interface 506 enables, for example, the display of images generated by the electronic system 500. Output devices used with output device interface 506 include, for example, printers and display devices, such as cathode ray tubes (CRT) or liquid crystal displays (LCD). Some implementations include devices such as a touchscreen that functions as both input and output devices.

Finally, as shown in FIG. 5, bus 508 also couples electronic system 500 to a network (not shown) through a network interface 516. In this manner, the computer can be a part of a network of computers such as a local area network ("LAN"), a wide area network ("WAN"), or an Intranet, or a network of networks, such as the Internet. Any or all components of electronic system 500 can be used in conjunction with the subject technology.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessors or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms "display" or "displaying" means displaying on an electronic device. As used in this specification and any claims of this application, the terms "computer-readable medium" and "computer-readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Aspects of the subject matter described in this specification can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some aspects, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged or that not all illustrated steps be performed. Some of the steps may be performed simultaneously. For example, in certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology. Features described under one heading or one subheading of the subject disclosure may be combined, in various embodiments, with features described under other headings or subheadings. Further, it is not necessarily the case that all features under a single heading or a single subheading are used together in embodiments.

A phrase such as an "aspect" does not imply that such aspect is essential to the subject technology or that such aspect applies to all configurations of the subject technology. A disclosure relating to an aspect may apply to all configurations, or one or more configurations. A phrase such as an "aspect" may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a "configuration" may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims.

What is claimed is:

1. A computer-implemented method for determining a display order for changing tabs within a window, the method comprising:
    identifying a plurality of tabs that are open in the window of a user interface of a computing device;
    tracking at least one duration of active time for each of the plurality of tabs;
    determining a score for each of the plurality of tabs based on each duration of active time for the respective tab, wherein the score is reset for a tab of the plurality of tabs that has been separated from the window;
    determining an order of the plurality of tabs based on the score for each of the plurality of tabs; and
    providing a graphical component for display in the user interface, wherein the graphical component displays a representation of each of the plurality of tabs in the determined order and is configured to receive a user selection of one of the plurality of tabs to activate the selected tab.

2. The method of claim 1, further comprising:
    identifying a measuring point for each duration of active time for each of the plurality of tabs; and
    determining the score for each of the plurality of tabs based on each measuring point for the respective tab.

3. The method of claim 2, wherein determining the score for each of the plurality of tabs comprises decreasing a portion of the score as a recency of each respective measuring point for the respective tab decays.

4. The method of claim 2, further comprising:
    determining the score for each of the plurality of tabs further based on the duration of each active time with respect to a recency of the respective measuring point.

5. The method of claim 1, wherein determining the score for each of the plurality of tabs comprises increasing a portion of the score as a current duration of active time for the respective tab increases.

6. The method of claim 1, wherein one of the plurality of tabs is associated with multiple durations of active time.

7. The method of claim 1, further comprising:
    resetting the determined score for each of the plurality of tabs when the respective tab is closed.

8. The method of claim 1, wherein one of the plurality of tabs has an automatic time limit.

9. A system for determining a display order for changing tabs within a window, the system comprising:
   one or more processors; and
   a memory containing processor-executable instructions that, when executed by the one or more processors, cause the system to:
      identify a plurality of tabs that are open in the window of a user interface of a computing device;
      track at least one duration of active time for each of the plurality of tabs;
      determine a score for each of the plurality of tabs based on each duration of active time for the respective tab, wherein the score is reset for a tab of the plurality of tabs that has been separated from the window;
      determine an order of the plurality of tabs based on the score for each of the plurality of tabs; and
      provide a graphical component for display in the user interface, wherein the graphical component displays a representation of each of the plurality of tabs in the determined order and is configured to receive a user selection of one of the plurality of tabs to activate the selected tab.

10. The system of claim 9, the memory further comprising instructions to:
   identify a measuring point for each duration of active time for each of the plurality of tabs; and
   determine the score for each of the plurality of tabs based on each measuring point for the respective tab.

11. The system of claim 10, wherein determining the score for each of the plurality of tabs comprises decreasing a portion of the score as a recency of each respective measuring point for the respective tab decays.

12. The system of claim 10, the memory further comprising instructions to:
   determine the score for each of the plurality of tabs further based on the duration of each active time with respect to a recency of the respective measuring point.

13. The system of claim 9, wherein determining the score for each of the plurality of tabs comprises increasing a portion of the score as a current duration of active time for the respective tab increases.

14. The system of claim 9, the memory further comprising instructions to:
   reset the determined score for each of the plurality of tabs when the respective tab is closed.

15. A machine-readable storage medium comprising machine-readable instructions for determining a display order for changing tabs within a window, the machine-readable instructions comprising:
   identifying a plurality of tabs that are open in the window of a user interface of a computing device;
   tracking at least one duration of active time for each of the plurality of tabs;
   determining a score for each of the plurality of tabs based on each duration of active time for the respective tab, wherein the score is reset for a tab of the plurality of tabs that has been separated from the window;
   determining an order of the plurality of tabs based on the score for each of the plurality of tabs; and
   providing a graphical component for display in the user interface, wherein the graphical component displays a representation of each of the plurality of tabs in the determined order and is configured to receive a user selection of one of the plurality of windows tabs to activate the selected tab.

16. The machine-readable storage medium of claim 15, wherein determining the score for each of the plurality of tabs comprises decreasing a portion of the score as a recency of each respective measuring point for the respective tab decays.

17. The machine-readable storage medium of claim 15, the machine-readable instructions further comprising:
   determining the score for each of the plurality of tabs further based on the duration of each active time with respect to a recency of the respective measuring point.

18. The machine-readable storage medium of claim 15, wherein determining the score for each of the plurality of tabs comprises increasing a portion of the score as a current duration of active time for the respective tab increases.

19. The machine-readable storage medium of claim 15, the machine-readable instructions further comprising:
   identifying a measuring point for each duration of active time for each of the plurality of tabs; and
   determining the score for each of the plurality of windows tabs based on each measuring point for the respective tab.

20. The machine-readable storage medium of claim 15, further comprising machine-readable instructions to:
   reset the determined score for each of the plurality of tabs when the respective tab is closed.

21. The machine-readable storage medium of claim 15, wherein the score is reset for a tab of the plurality of tabs when the tab is joined with the window.

* * * * *